No. 751,576. PATENTED FEB. 9, 1904.
C. H. VEEDER.
STEERING MECHANISM FOR MOTOR VEHICLES.
APPLICATION FILED SEPT. 2, 1903.
NO MODEL.

Attest:
A. N. Jesbera
Martin Roberts.

Inventor:
Curtis Hussey Veeder
by Redding, Kiddle & Greeley
Attys.

No. 751,576. Patented February 9, 1904.

UNITED STATES PATENT OFFICE.

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

STEERING MECHANISM FOR MOTOR-VEHICLES.

SPECIFICATION forming part of Letters Patent No. 751,576, dated February 9, 1904.

Application filed September 2, 1903. Serial No. 171,661. (No model.)

*To all whom it may concern:*

Be it known that I, CURTIS HUSSEY VEEDER, a citizen of the United States, residing in the city of Hartford, in the county of Hartford, in the State of Connecticut, have invented certain new and useful Improvements in Steering Mechanism for Motor-Vehicles, of which the following is a specification, reference being had to the accompanying drawings, forming a part hereof.

The object of this invention is to produce an improved hydraulic check for the steering mechanism of motor-vehicles which shall offer resistance to the accidental deflection of the wheels of the vehicle, as when such wheels pass over some obstacle on the road-surface, and yet shall not prevent the easy manipulation of the steering-lever when it is desired to change the path of the vehicle, as in turning corners, the resistance offered after the steering-lever has passed its middle position being considerably less than that offered as it starts from such middle position.

A further object is to so construct the check that there shall be little liability to leakage of the fluid employed and at the same time to prevent the accumulation of air-bubbles otherwise destroying that uniformity of action of the device which is highly desirable.

The invention will be fully described hereinafter with reference to the accompanying drawings, in which it is illustrated in a convenient and practical form, and in which—

Figure 1:
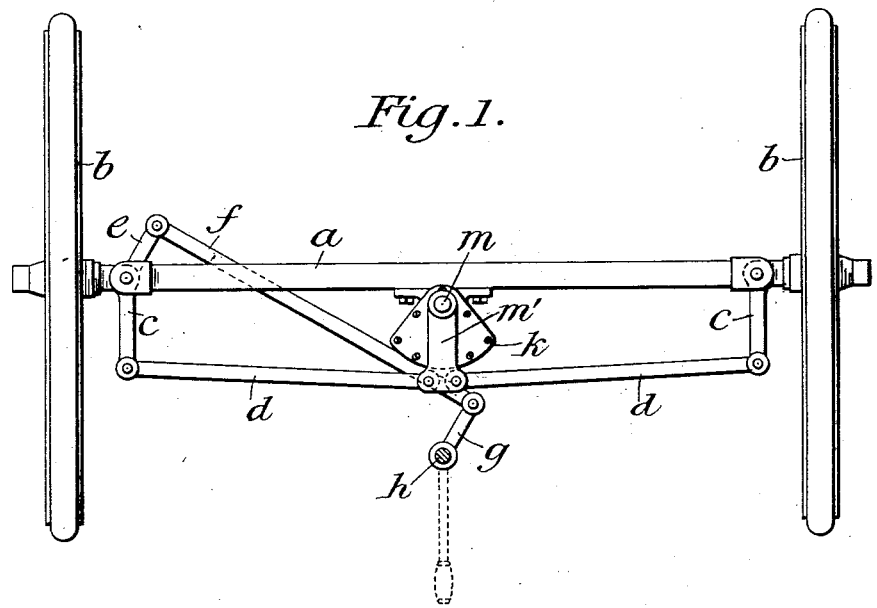
Figure 2:
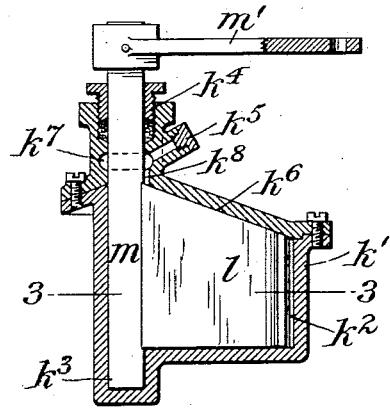
Figure 3:
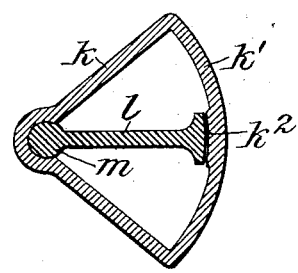

Figure 1 is a plan view showing the front axle and independent steering-wheel of a motor-vehicle with their connections and with the improved hydraulic check applied thereto. Fig. 2 is a detail view, in vertical section, illustrating the construction of the improved check. Fig. 3 is a horizontal section on the plane indicated by the line 3 3 of Fig. 2.

The improved check may be readily applied to any ordinary steering mechanism without modification thereof or with but slight modification and, as shown in Fig. 1 of the drawings, is applied to a steering mechanism in which the front axle or front transverse member $a$ of the running-frame supports at its ends the independent steering-wheels $b$, the latter being mounted on stud-axles forming part of the steering-knuckles $c$, which are pivoted at the ends of the member $a$, as usual. The steering-knuckles are shown as connected to move together by links $d$, which may be severally pivoted to an intermediate pivoted arm $m'$, hereinafter referred to. One of the steering-knuckles $c$ may be provided, as usual, with an arm $e$, which in turn may be connected by a link $f$ with an arm $g$ on the usual steering-shaft $h$, the latter being provided with a steering lever or wheel suitably placed above the floor of the vehicle-body for operation by the driver. As will be readily understood, however, the steering-shaft might be the pivot of the arm $m'$, through which in the construction shown the hydraulic check is interposed in the steering mechanism, it being a matter of convenience in the application of the device to any particular steering mechanism how the check shall be connected with the steering mechanism.

As shown in the drawings, the hydraulic check comprises a casing $k$, which is firmly secured, preferably, to the axle or front transverse member $a$. Within the casing is mounted a stem $m$, which supports a wing-piston $l$, the latter having a free working fit within the casing, the wall $k'$ of which is substantially concentric with the axis about which the wing-piston oscillates. The wall $k'$ is thickened inwardly at the middle line, so that the wing-piston $l$ shall there have less clearance than at either side thereof, the purpose being to offer the maximum resistance to the deflection of the wheels while the vehicle is running in a straight path and the steering-lever is in its middle position and thereafter to reduce the resistance so that the steering of the vehicle may be effected easily when the steering-lever has passed the middle point. The casing is provided at its bottom with a suitable step $k^3$ for the stem $m$ and at its top, if necessary, with a suitable stuffing-box $k^4$, and a suitable filling-head $k^5$ is also provided for the introduction of the liquid into the casing. As will be observed by reference to Fig. 2, the top $k^6$ of the segmental chamber formed by the casing $k$ is conical, so that any air-bubbles which may be carried with the liquid into the chamber may collect around the stem $m$ and any disturbance in uniformity of movement of the mechanism which might be occasioned by the pressure of air-bubbles in the path of movement of the piston be prevented. The complete elimination of air-bubbles from the path of the piston may be further provided for by forming in the neck of the casing $k$ an annular chamber $k^7$, communicating directly with the filling-head $k^5$ and also communicating with the piston-chamber through a passage $k^8$, adjacent to the stem $m$. The annular chamber $k^7$ may thus contain a surplus of liquid to make up for any loss within the piston-chamber, while any air in the piston-chamber rises at once into the annular chamber $k^7$.

In operation it will be understood that the chamber is filled with any suitable liquid and that the liquid is therein displaced from one side of the piston to the other as the piston moves with the steering mechanism in which it is connected, the resistance to the deflection of the steering-wheels being determined by the clearance provided between the piston and the casing.

It is obviously immaterial how the improved hydraulic check is connected to the steering mechanism, it being possible, for example, to apply the steering-handle directly to an extension of the stem or shaft $m$.

I claim as my invention—

1. The combination with a steering mechanism for motor-vehicles, of a hydraulic check therefor comprising an oscillating wing-piston connected to the steering mechanism and a casing within which said piston is free to oscillate and having one wall substantially concentric with the oscillating piston and thickened interiorly at a middle point to reduce the clearance at that point between the piston and the wall of the casing, substantially as described.

2. The combination with a steering mechanism for motor-vehicles, of a hydraulic check therefor comprising an oscillating wing-piston and a casing within which said piston is free to oscillate, the top of said casing being conical to direct air-bubbles in the inclosed liquid toward the axis of oscillation of the piston, substantially as described.

3. The combination with a steering mechanism for motor-vehicles, of a hydraulic check therefor comprising an oscillating wing-piston and a casing in which said piston is mounted for oscillation, the neck of said casing about the stem of the piston being formed with an annular chamber communicating with the top of the main piston-chamber, substantially as described.

This specification signed and witnessed this 28th day of August, A. D. 1903.

CURTIS HUSSEY VEEDER.

In presence of—
Wm. B. Dunning,
E. G. Biddle.